(12) United States Patent
Zhou et al.

(10) Patent No.: US 11,917,584 B2
(45) Date of Patent: Feb. 27, 2024

(54) SIDELINK BEAM OR TRANSMISSION PARAMETER RANGE RESTRICTION

(71) Applicant: QUALCOMM Incorporated, San Diego, CA (US)

(72) Inventors: Yan Zhou, San Diego, CA (US); Qian Zhang, Basking Ridge, NJ (US); Jelena Damnjanovic, Del Mar, CA (US); Tao Luo, San Diego, CA (US); Junyi Li, Fairless Hills, PA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/450,636

(22) Filed: Oct. 12, 2021

(65) Prior Publication Data
US 2023/0116674 A1  Apr. 13, 2023

(51) Int. Cl.
*H04W 72/02* (2009.01)
*H04W 72/044* (2023.01)
*H04W 72/20* (2023.01)
*H04W 72/23* (2023.01)
*H04W 72/51* (2023.01)
*H04W 72/541* (2023.01)

(52) U.S. Cl.
CPC ........ *H04W 72/02* (2013.01); *H04W 72/046* (2013.01); *H04W 72/20* (2023.01); *H04W 72/23* (2023.01); *H04W 72/51* (2023.01); *H04W 72/541* (2023.01)

(58) Field of Classification Search
None
See application file for complete search history.

(56) References Cited

U.S. PATENT DOCUMENTS

| | | | |
|---|---|---|---|
| 11,678,353 B2* | 6/2023 | Choi | H04W 72/046 370/329 |
| 2019/0281588 A1* | 9/2019 | Zhang | H04B 7/0617 |
| 2020/0396703 A1* | 12/2020 | Luo | H04W 24/10 |
| 2021/0099847 A1* | 4/2021 | Uchiyama | H04B 7/0695 |
| 2021/0135928 A1* | 5/2021 | Yi | H04W 72/21 |
| 2022/0386355 A1* | 12/2022 | Yi | H04W 72/569 |
| 2023/0030518 A1* | 2/2023 | Ren | H04W 52/243 |
| 2023/0156645 A1* | 5/2023 | Yao | H04W 56/0045 455/12.1 |

FOREIGN PATENT DOCUMENTS

WO    WO-2021080869 A1 *  4/2021  ........... H04B 7/0452

* cited by examiner

*Primary Examiner* — Kodzovi Acolatse
(74) *Attorney, Agent, or Firm* — Arun Swain

(57) ABSTRACT

Various aspects of the present disclosure generally relate to wireless communication. In some aspects, a user equipment (UE) may receive, from a base station, at least one of a first indication of a set of beams allowed for sidelink communication or a second indication of a range allowed for a sidelink transmission parameter. The UE may communicate on a sidelink in accordance with at least one of the set of beams or the range. Numerous other aspects are described.

30 Claims, 10 Drawing Sheets

SIDELINK BEAM OR TRANSMISSION PARAMETER RANGE RESTRICTION

FIELD OF THE DISCLOSURE

Aspects of the present disclosure generally relate to wireless communication and to techniques and apparatuses for sidelink beam or transmission parameter range restriction.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include receiving, from a base station, at least one of a first indication of a set of beams allowed for sidelink communication or a second indication of a range allowed for a sidelink transmission parameter. The method may include communicating on a sidelink in accordance with at least one of the set of beams or the range.

Some aspects described herein relate to a method of wireless communication performed by an apparatus of base station. The method may include receiving an indication of cross-link interference. The method may include transmitting, to a UE and based at least in part on receiving the indication, at least one of a first indication of a set of beams allowed for sidelink communication or a second indication of a range allowed for a sidelink transmission parameter.

Some aspects described herein relate to an apparatus for wireless communication at a UE. The apparatus may include a memory and one or more processors coupled to the memory. The one or more processors may be configured to receive, from a base station, at least one of a first indication of a set of beams allowed for sidelink communication or a second indication of a range allowed for a sidelink transmission parameter. The one or more processors may be configured to communicate on a sidelink in accordance with at least one of the set of beams or the range.

Some aspects described herein relate to an apparatus for wireless communication at a base station. The apparatus may include a memory and one or more processors coupled to the memory. The one or more processors may be configured to receive an indication of cross-link interference. The one or more processors may be configured to transmit, to a UE and based at least in part on receiving the indication, at least one of a first indication of a set of beams allowed for sidelink communication or a second indication of a range allowed for a sidelink transmission parameter.

Some aspects described herein relate to a non-transitory computer-readable medium that stores a set of instructions for wireless communication by a UE. The set of instructions, when executed by one or more processors of the UE, may cause the UE to receive, from a base station, at least one of a first indication of a set of beams allowed for sidelink communication or a second indication of a range allowed for a sidelink transmission parameter. The set of instructions, when executed by one or more processors of the UE, may cause the UE to communicate on a sidelink in accordance with at least one of the set of beams or the range.

Some aspects described herein relate to a non-transitory computer-readable medium that stores a set of instructions for wireless communication by a base station. The set of instructions, when executed by one or more processors of the base station, may cause the base station to receive an indication of cross-link interference. The set of instructions, when executed by one or more processors of the base station, may cause the base station to transmit, to a UE and based at least in part on receiving the indication, at least one of a first indication of a set of beams allowed for sidelink communication or a second indication of a range allowed for a sidelink transmission parameter.

Some aspects described herein relate to an apparatus for wireless communication. The apparatus may include means for receiving, from a base station, at least one of a first indication of a set of beams allowed for sidelink communication or a second indication of a range allowed for a sidelink transmission parameter. The apparatus may include means for communicating on a sidelink in accordance with at least one of the set of beams or the range.

Some aspects described herein relate to an apparatus for wireless communication. The apparatus may include means for receiving an indication of cross-link interference. The apparatus may include means for transmitting, to a UE and based at least in part on receiving the indication, at least one of a first indication of a set of beams allowed for sidelink communication or a second indication of a range allowed for a sidelink transmission parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
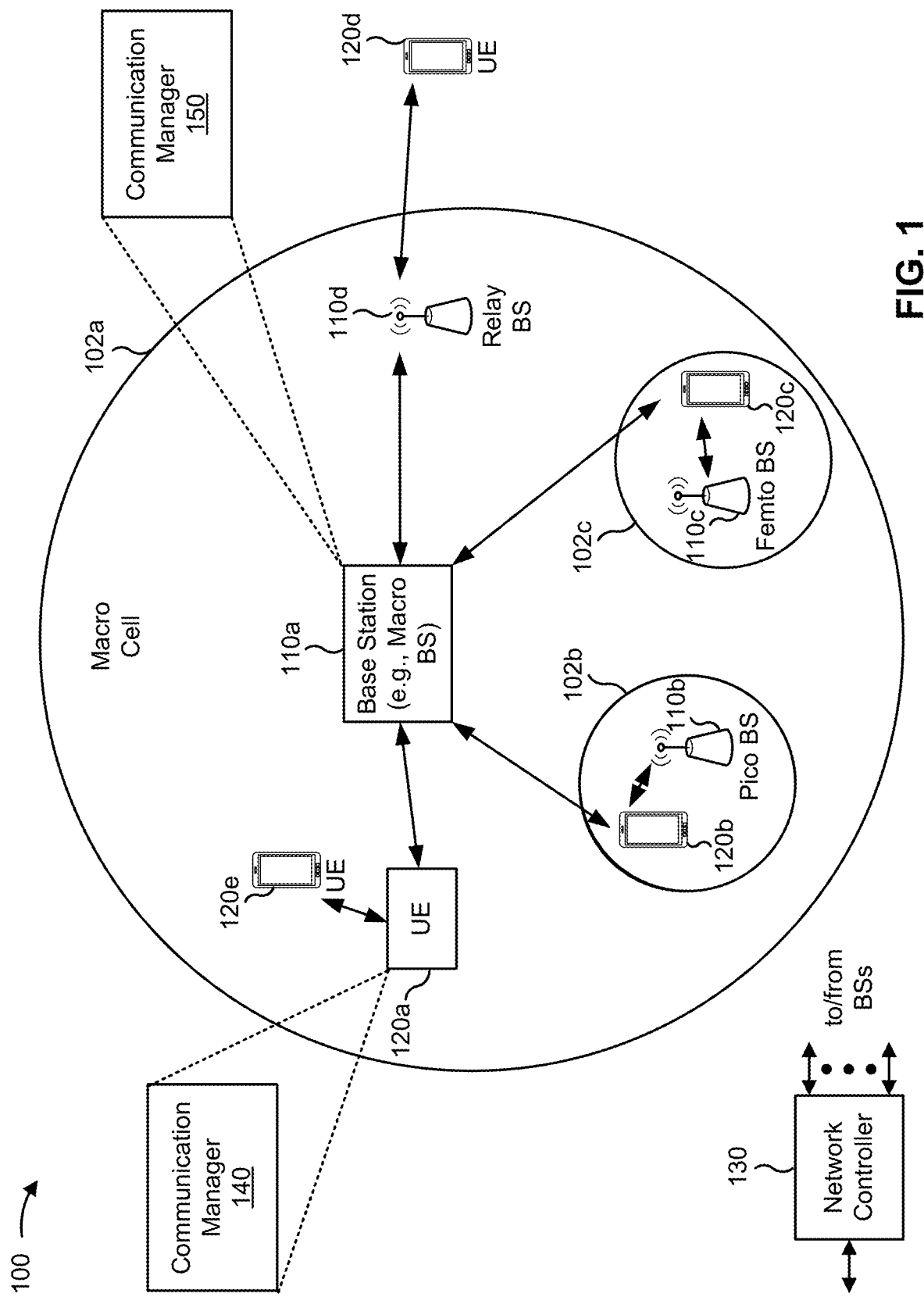
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, at least one of a first indication of a set of beams allowed for sidelink communication or a second indication of a range allowed for a sidelink transmission parameter; and communicate on a sidelink in accordance with at least one of the set of beams or the range. Additionally, or alternatively, the communication manager 140 may perform one or more other operations described herein.

In some aspects, the base station 110 may include a communication manager 150. As described in more detail elsewhere herein, the communication manager 150 may receive an indication of cross-link interference; and transmit, to a UE and based at least in part on receiving the indication, at least one of a first indication of a set of beams allowed for sidelink communication or a second indication of a range allowed for a sidelink transmission parameter. Additionally, or alternatively, the communication manager 150 may perform one or more other operations described herein.

As indicated above, FIG. 1 is provided as an example. Other examples may differ from what is described with regard to FIG. 1.

Figure 2:
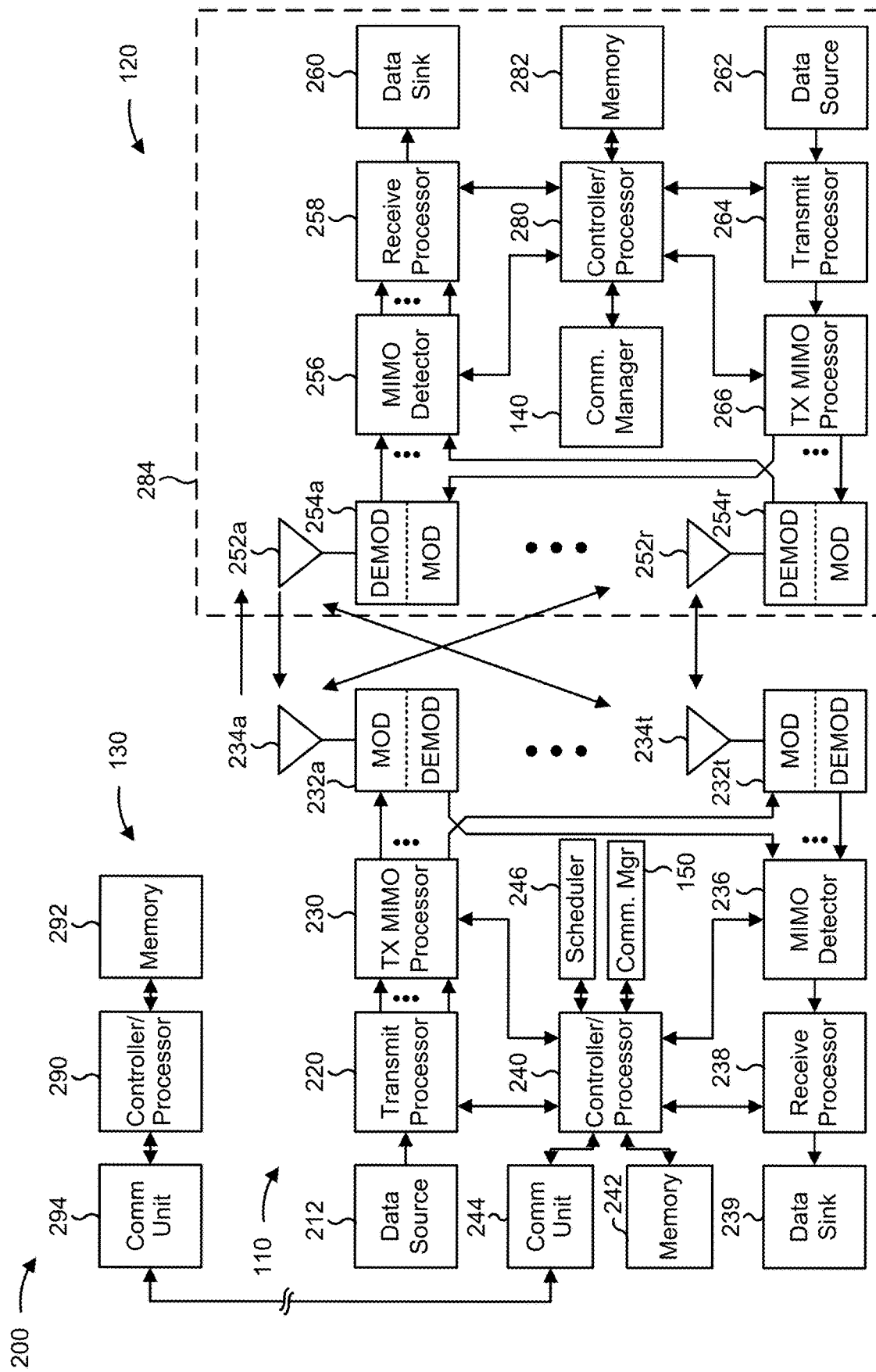
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with sidelink beam or transmission parameter range restriction, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a base station, at least one of a first indication of a set of beams allowed for sidelink communication or a second indication of a range allowed for a sidelink transmission parameter; and/or means for communicating on a sidelink in accordance with at least one of the set of beams or the range. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for receiving an indication of cross-link interference; and/or means for transmitting, to a UE and based at least in part on receiving the indication, at least one of a first indication of a set of beams allowed for sidelink communication or a second indication of a range allowed for a sidelink transmission parameter. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
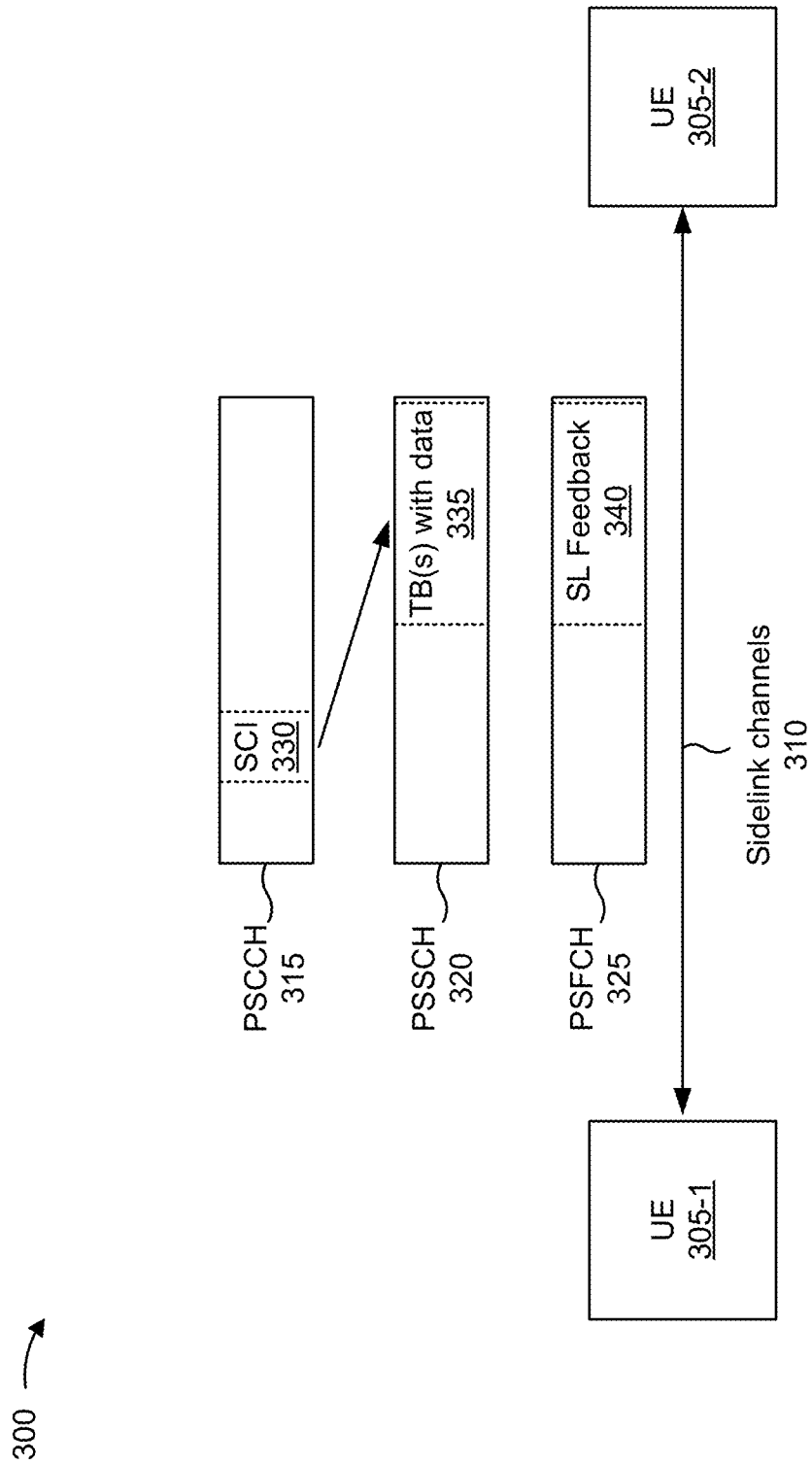
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
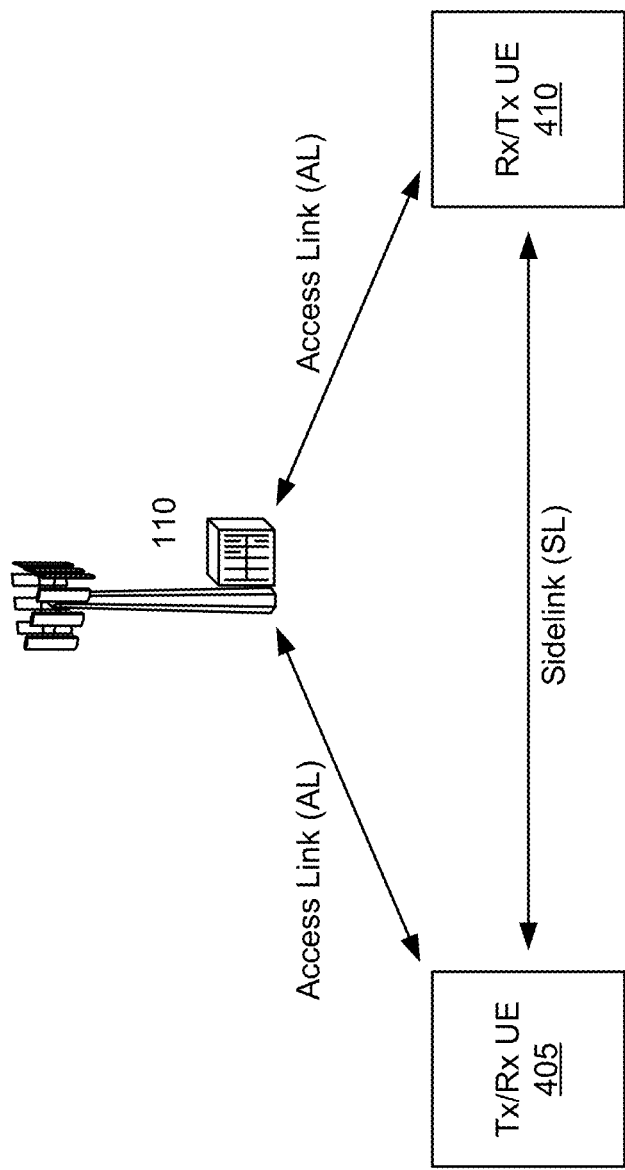
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
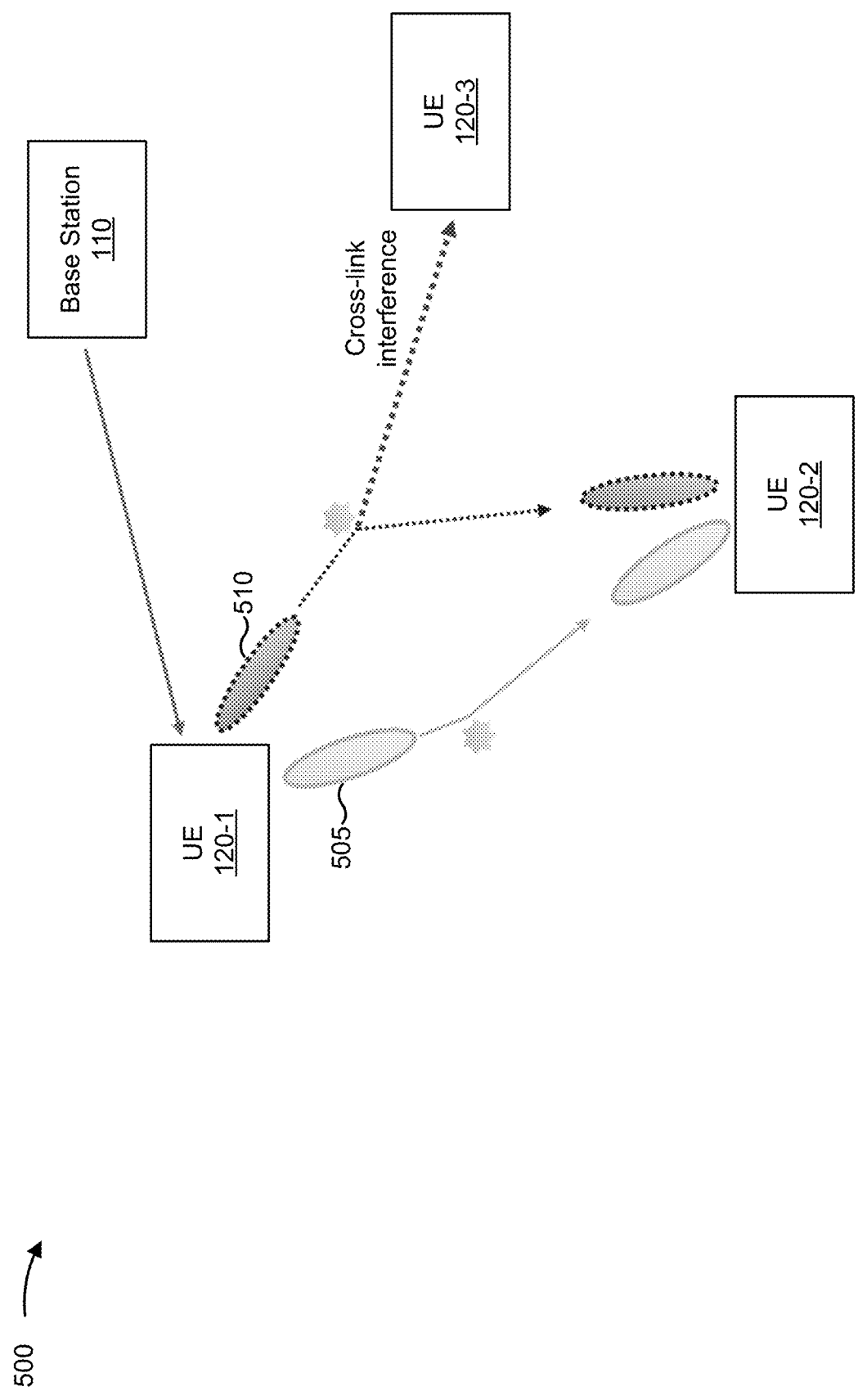
FIG. 5 is a diagram illustrating an example relating to sidelink cross-link interference, in accordance with the present disclosure.

FIG. 5 is a diagram illustrating an example 500 relating to sidelink cross-link interference, in accordance with the present disclosure. As shown in FIG. 5, a first UE 120-1 may use a first candidate beam 505 to transmit a sidelink communication to a second UE 120-2. As shown, use of the first candidate beam 505 may not result in cross-link interference with a neighbor UE 120-3. Moreover, the first UE 120-1 may also use a second candidate beam 510 to transmit the sidelink communication to the second UE 120-2. As shown, use of the second candidate beam 510 may result in cross-link interference with the neighbor UE 120-3.

In some examples, a base station 110 may not collect sidelink CSI reports from UEs in order to reduce signaling overhead. Here, link adaptation may be determined by a UE performing sidelink transmission. Moreover, in some examples (e.g., in FR2), the base station 110 may not collect sidelink beam management reports from UEs in order to reduce signaling overhead. Here, a UE performing sidelink transmission may select a beam for the transmission. For example, the UE may select a sidelink beam based on sidelink link conditions (e.g., without regard to cross-link interference). Accordingly, with reference to example 500, the first UE 120-1 may select the second candidate beam 510 for transmission to the second UE 120-2, even though the second candidate beam 510 causes cross-link interference with the neighbor UE 120-3 and the first candidate beam 505 does not cause cross-link interference with the neighbor UE 120-3. The transmission using the second candidate beam 510 may be received by the neighbor UE 120-3 and may interfere with reception by the neighbor UE 120-3 of a downlink communication from the base station 110 or of another sidelink communication.

Some techniques and apparatuses described herein enable a base station to restrict the sidelink beams and/or restrict the sidelink transmission parameters that are used by a UE for sidelink communication. For example, the base station may receive an indication of cross-link interference (e.g., from a neighboring UE experiencing the interference), and based at least in part on receiving the indication, the base station may transmit to a UE a first indication of a set of beams allowed for sidelink communication and/or a second indication of respective ranges allowed for one or more sidelink transmission parameters per beam. The UE may communicate on a sidelink in accordance with the set of beams that are allowed and/or the one or more ranges that are allowed, thereby mitigating or resolving the cross-link interference and improving reception at the neighboring UE.

As indicated above, FIG. 5 is provided as an example. Other examples are possible and may differ from what was described with respect to FIG. 5.

Figure 6:
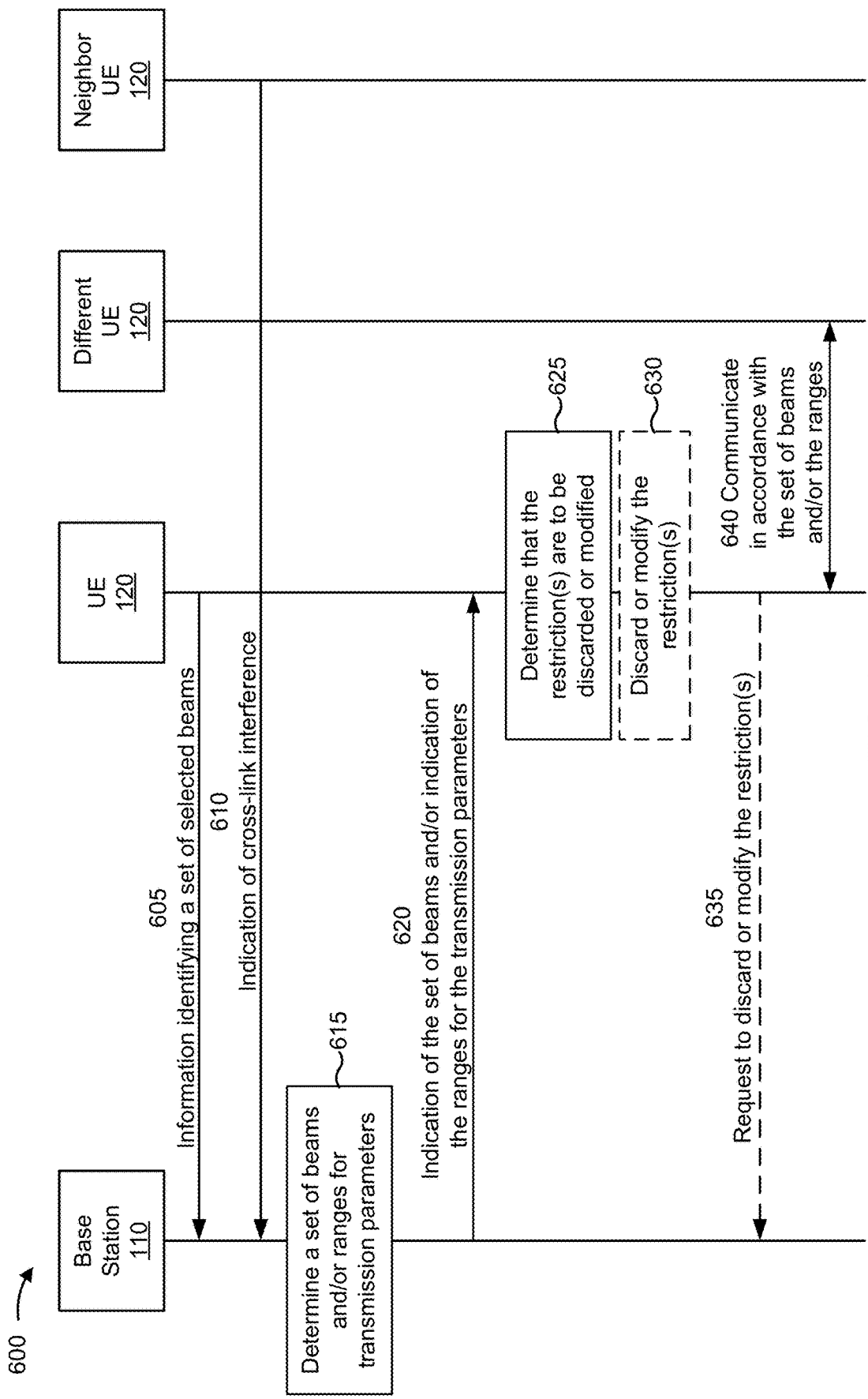
FIG. 6 is a diagram illustrating an example associated with sidelink beam or transmission parameter range restriction, in accordance with the present disclosure.

FIG. 6 is a diagram illustrating an example 600 associated with sidelink beam or transmission parameter range restriction, in accordance with the present disclosure. As shown in FIG. 6, a base station 110 and one or more UEs 120 may communicate with one another.

As shown by reference number 605, a UE 120 may transmit, and the base station 110 may receive, information identifying a set of selected beams (e.g., one or more selected beams) for sidelink communication. For example, the UE 120 may select one or more beams for sidelink communication (e.g., based at least in part on measurements performed by the UE 120), and the UE 120 may transmit the information identifying the set of selected beams based at least in part on selecting the one or more beams.

As shown by reference number 610, a neighbor UE 120 may transmit, and the base station 110 may receive, an indication of cross-link interference. For example, the neighbor UE 120 may perform cross-link interference measurements (e.g., in connection with one or more other UEs), and the base station 110 may receive the indication from the neighbor UE 120 based at least in part on a cross-link interference measurement (e.g., RSRP) satisfying a threshold. In some implementations, the indication of cross-link interference may indicate that the cross-link interference is associated with the UE 120.

As shown by reference number 615, the base station 110 may determine a set of beams (e.g., one or more beams) that are allowed for sidelink communication for the UE 120 (e.g., a restriction on the beams that may be used by the UE 120) and/or may determine respective ranges for one or more sidelink transmission parameters that are allowed for sidelink communication for the UE 120 (e.g., a restriction on sidelink transmission parameters that may be used by the UE 120). In other words, sidelink communication of the UE 120 may be restricted to using the set of beams and/or restricted to using the ranges for the sidelink transmission parameters. The base station 110 may determine the set of beams and/or the ranges based at least in part on the indication of cross-link interference. Additionally, or alternatively, the base station 110 may determine the set of beams and/or the range(s) based at least in part on the information identifying the set of selected beams. For example, the set of beams determined by the base station 110 may be a subset of the set of selected beams and/or the base station 110 may determine ranges for the one or more sidelink transmission parameters for the set of selected beams.

As shown by reference number 620, the base station 110 may transmit, and the UE 120 may receive, a first indication of the set of beams (e.g., a numerical range of beams) allowed for sidelink communication and/or a second indication of the respective ranges allowed for one or more sidelink transmission parameters (e.g., a first range for a first parameter, a second range for a second parameter, and so on). For example, the base station 110 may transmit, and the UE 120 may receive, only the first indication, only the second indication, or both the first indication and the second indication. In some aspects, the first indication may indicate beams that are allowed for sidelink communication and/or beams that are not allowed for sidelink communication (e.g., thereby implicitly indicating the beams that are allowed for sidelink communication). In some aspects, the second indication may indicate respective ranges that are allowed for sidelink communication and/or respective ranges that are not allowed for sidelink communication (e.g., thereby implicitly indicating the ranges that are allowed for sidelink communication).

In some aspects, the first indication may include a list (e.g., an explicit list) of one or more sidelink beam identifiers. For example, the first indication may include a list of one or more sidelink beam identifiers for beams that are allowed for sidelink communication and/or a list of one or more sidelink beam identifiers for beams that are not allowed for sidelink communication. In some aspects, the first indication may include a bitmap indicating, among all (e.g., a plurality of) sidelink beam identifiers (e.g., for the UE 120), sidelink beam identifiers for beams that are allowed for sidelink communication (e.g., indicated by a 1 value in the bitmap) and/or sidelink beam identifiers for beams that are not allowed for sidelink communication (e.g., indicated by a 0 value in the bitmap). In some aspects, the first indication may indicate that the set of beams are allowed (or disallowed) for transmission, that the set of beams are allowed (or disallowed) for reception, or that the set of beams are allowed (or disallowed) for both transmission and reception (e.g., a single set of beams may be allowed for both transmission and reception or respective sets of beams may be allowed for transmission and reception, respectively). That is, the base station 110 may indicate one or more sets of beams, each indicated for transmission, reception, or both transmission and reception.

In some aspects, the first indication may indicate a beam of the set of beams by an identifier for a transmission configuration indicator (TCI) state used by the first UE 120 (e.g., a TCI state used by the sidelink UE that is applying the indicated set of beams). In other words, a sidelink beam identifier used in the first indication, as described above, may be a TCI state identifier. In some aspects, a TCI state, identified by a TCI state identifier, may be used for transmission beam indication for the first UE 120 and/or for reception beam indication for the first UE 120. In some aspects, a TCI state, identified by a TCI state identifier, may be applied to a single channel or reference signal or may be applied to multiple channels or reference signals.

In some aspects, the first indication may indicate a beam of the set of beams by an identifier for a reference signal transmitted by the UE 120 (e.g., a reference signal transmitted by the sidelink UE that is applying the indicated set of beams). In other words, a sidelink beam identifier used in the first indication, as described above, may be a reference signal identifier for a reference signal transmitted by the UE 120. In some aspects, a transmit beam indicated by a reference signal identifier may be indicated as allowed (or disallowed) for transmission, indicated as allowed (or disallowed) for reception, and/or indicated as allowed (or disallowed) for both transmission and reception.

In some aspects, the first indication may indicate a beam of the set of beams by an identifier for a reference signal transmitted by a node other than the UE 120 (e.g., an identifier for a reference signal received by the UE 120). In other words, a sidelink beam identifier used in the first indication, as described above, may be a reference signal identifier for a reference signal transmitted by a node other than the UE 120. In some aspects, a receive beam indicated by a reference signal identifier may be indicated as allowed (or disallowed) for transmission, indicated as allowed (or disallowed) for reception, and/or indicated as allowed (or disallowed) for both transmission and reception.

In some aspects, the second indication may indicate respective ranges for one or more sidelink transmissions parameters for a particular beam (e.g., for a particular beam identifier). That is, ranges for one or more sidelink transmission parameters that are allowed for sidelink communication may be indicated per beam (e.g., per beam identifier, such as per TCI state identifier or reference signal identifier). In this way, the base station 110 may manage cross-link interference with improved control (e.g., particularly if the UE 120 performs selection of a sidelink beam for sidelink communication).

The ranges for the one or more sidelink transmission parameters may include a range for a transmission power parameter. The range for the transmission power parameter may be identified by a maximum and/or a minimum transmission power, and/or identified by a maximum and/or a minimum power backoff (e.g., relative to a maximum output power permitted for a particular power class). The ranges for the one or more sidelink transmission parameters may include a range for an MCS parameter (e.g., a range of MCSs), a range for a transmission layers parameter (e.g., a range of a quantity of transmission layers), a range for a DMRS ports parameter (e.g., a range of a quantity of DMRS ports), and/or a range for a transmissions per transport block parameter (e.g., a range of a quantity of transmissions per transport block).

The ranges for the one or more sidelink transmission parameters may include a range for a frequency resource parameter (e.g., a range of resource blocks, subchannels, bandwidth parts (BWPs), resource pools, and/or component carriers). The range for the frequency resource parameter may be identified by resource block identifiers, a quantity of resource blocks, subchannel identifiers, a quantity of subchannels, BWP identifiers, resource pool identifiers, and/or component carrier identifiers. In some aspects, the ranges for the one or more sidelink transmission parameters may include a range for a time resource parameter (e.g., a range of slots and/or symbols). The range for the time resource parameter may be identified by slot identifiers, symbol identifiers, or the like (e.g., within a periodic pattern, by resource pool, and/or by resource reservation period, which may include disablement of a transmission for resource reservation in a resource reservation period). In some aspects, the ranges for the one or more sidelink transmission parameters may include a range for a power control parameter (e.g., a PO parameter, an alpha parameter, a closed loop index parameter, and/or a pathloss reference signal parameter).

In some aspects, the set of beams and/or the respective ranges for the one or more sidelink transmission parameters may be allowed for (e.g., may be restricted to) particular links, resources (e.g., frequency resources or time resources), resource allocation modes, traffic priority levels, transmission types (e.g., initial transmissions or retransmissions), and/or cast types (e.g., unicast, multicast, or broadcast). In some aspects, the first indication and/or the second indication may indicate the particular links, resources, resource allocation modes, traffic priority levels, transmission types, and/or cast types for which the set of beams and/or the respective ranges are allowed.

The set of beams and/or the respective ranges for the one or more sidelink transmission parameters may be allowed for (e.g., applied to) particular sidelink links (e.g., unicast, multicast, and/or broadcast sidelink links), which may be identified by transmitter identifiers or receiver identifiers. The set of beams and/or the respective ranges for the one or more sidelink transmission parameters may be allowed for (e.g., applied to) particular BWPs, resource pools, and/or component carriers (e.g., per sidelink link). The set of beams and/or the respective ranges for the one or more sidelink transmission parameters may be allowed for (e.g., applied to) sidelink resource allocation mode 1 (in which resource allocation is performed by a base station) and/or sidelink resource allocation mode 2 (in which resource allocation is performed by a UE). The set of beams and/or the respective ranges for the one or more sidelink transmission parameters may be allowed for (e.g., applied to) particular sidelink logical channels and/or QoS flows associated with a priority level in a particular range. The set of beams and/or the respective ranges for the one or more sidelink transmission parameters may be allowed for (e.g., applied to) initial transmissions and/or retransmissions. The set of beams and/or the respective ranges for the one or more sidelink transmission parameters may be allowed for (e.g., applied to) unicast, multicast, and/or broadcast sidelink links.

In some aspects, the base station 110 may transmit, and the UE 120 may receive, the first indication and/or the second indication in an RRC message, a medium access control control element (MAC-CE), and/or DCI. In some aspects, the set of beams and/or the respective ranges for the one or more sidelink transmission parameters may be indicated in (e.g., configured in) the RRC message in an information element for a BWP, an information element for a resource pool, or an information element for a component carrier, among other examples. In other words, a respective information element for each (e.g., for each applied) BWP, resource pool, or component carrier may indicate a respective first indication and/or second indication. In some aspects, the set of beams and/or the respective ranges for the one or more sidelink transmission parameters may be indicated in the DCI, and the DCI (e.g., for sidelink resource allocation mode 1) may schedule one or more sidelink communications for the UE 120. The set of beams and/or the respective ranges for the one or more sidelink transmission parameters may be indicated in the DCI using reserved bits and/or using one or more fields assigned for indicating a set of beams and/or one or more ranges (e.g., in DCI format 3_x).

The UE 120 may apply a restriction to the set of beams that are allowed for sidelink communication and/or a restriction to the respective ranges that are allowed for the one or more sidelink transmission parameters. As shown by reference number 625, the UE 120 may determine that the restriction to the set of beams and/or the restriction to the respective ranges is to be discarded (e.g., ignored) or modified (e.g., relaxed). For example, the UE 120 may determine that the restriction to the set of beams and/or the restriction to the respective ranges is to be discarded or modified based at least in part on applying the restriction to the set of beams and/or applying the restriction to the respective ranges.

In some aspects, the UE 120 may determine that the restriction to the set of beams and/or the restriction to the respective ranges is to be discarded or modified based at least in part on a determination that, with the restrictions, there is no sidelink beam of good quality (e.g., no sidelink beam that satisfies a quality threshold). That is, the UE 120 may determine that the restriction to the set of beams and/or the restriction to the respective ranges is to be discarded or modified based at least in part on a determination that a sidelink beam of good quality (e.g., a sidelink beam that satisfies a quality threshold) is achievable only if the restriction to the set of beams and/or the restriction to the respective ranges is discarded or modified.

In some aspects, the UE 120 may determine that the restriction to the set of beams and/or the restriction to the respective ranges is to be discarded or modified based at least in part for a determination that, with restriction to the set of beams and/or one or more of the ranges, there is no sidelink beam that satisfies a metric threshold (e.g., an RSRP threshold, an RSRQ threshold, and/or a signal to interference plus noise ratio (SINR) threshold). In other words, a triggering condition for discarding (e.g., ignoring) or modifying (e.g., relaxing) the restriction to the set of beams and/or the restriction to the respective ranges may be that, with the restrictions, there is no sidelink beam that can achieve a minimum performance level (e.g., there is no sidelink beam associated with an RSRP, an RSRQ, and/or an SINR that exceeds a threshold). In some aspects, the UE 120 may determine that the restriction to the set of beams and/or the restriction to the respective ranges is to be discarded or modified based at least in part on a determination that a difference between a metric (e.g., a best or highest metric) that is achievable among selected sidelink beams, with restriction to the set of beams and/or the respective ranges, and a metric (e.g., a best or highest metric) that is achievable among the selected beams, without restriction to the set of beams and/or the respective ranges, satisfies a threshold. In other words, a triggering condition for discarding (e.g., ignoring) or modifying (e.g., relaxing) the restriction to the set of beams and/or the restriction to the respective ranges may be that, with the restrictions, a best achievable metric (e.g., RSRP, RSRQ, and/or SINR) among sidelink beams (e.g., sidelink beams selected by the UE 120) is a threshold amount less than the metric that could be achieved without the restrictions.

As shown by reference number 630, the UE 120 may discard (e.g., ignore) or modify (e.g., relax) the restriction to the set of beams and/or the restriction to one or more of the ranges (e.g., autonomously). The UE 120 may discard or modify the restriction to the set of beams and/or the restriction to one or more of the ranges based at least in part on satisfaction of one or more of the triggering conditions, as described above. For example, the UE 120 may discard or modify the restriction to the set of beams and/or the restriction to one or more of the ranges based at least in part on determining that the metric threshold is not satisfied with restriction to the set of beams and/or with restriction to the one or more ranges. As another example, the UE 120 may discard or modify the restriction to the set of beams and/or the restriction to one or more of the ranges based at least in part on determining that the difference between the metric that is achievable with restriction to the set of beams and/or the one or more ranges and the metric that is achievable without restriction to the set of beams and/or the one or more ranges satisfies a threshold. In some aspects, the UE 120 may (e.g., autonomously) modify (e.g., relax) the restriction to the set of beams and/or the restriction to one or more of the ranges to achieve a minimum performance level (e.g., to satisfy the metric threshold) and/or to achieve a difference between the metric that is achievable with restriction to the set of beams and/or the one or more ranges and the metric that is achievable without restriction to the set of beams and/or the one or more ranges that is no more than the threshold.

As shown by reference number 635, the UE 120 may transmit, and the base station 110 may receive, a request to discard or modify the restriction to the set of beams and/or the restriction to one or more of the ranges. That is, the UE 120 may transmit the request as an alternative to autonomously discarding or modifying the restrictions. The request may indicate an amount, preferred by the UE 120, for modifying the restrictions. For example, the amount may be an amount to expand a range, an amount for a minimum of a range, an amount for a maximum of a range, or the like. The UE 120 may determine the amount in a similar manner as described above for autonomous modification. In some aspects, the request may indicate one or more beams, preferred by the UE 120, for modifying the set of beams. In some aspects, the base station 110 may transmit in response to the request, and the UE 120 may receive, an indication to discard the set of beams and/or the respective ranges, an indication to modify the set of beams and/or the respective ranges (e.g., using a particular modification or by a particular amount), and/or a new first indication of a new set of beams and/or a new second indication of new respective ranges for one or more transmission parameters.

As shown by reference number 640, the UE 120 may communicate on a sidelink (e.g., with a different UE 120) in accordance with the set of beams that are allowed for sidelink communication and/or the respective ranges that are allowed for the one or more sidelink transmission parameters. For example, the UE 120 may select a beam from the set of beams for sidelink communication. As another example, the UE 120 may use one or more sidelink transmission parameters, for sidelink communication, that are within the ranges (e.g., the ranges associated with the particular beam that is selected). In some aspects, the UE 120 may communicate on the sidelink in accordance with the set of beams and/or the respective ranges as modified or discarded.

As indicated above, FIG. 6 is provided as an example. Other examples may differ from what is described with respect to FIG. 6.

Figure 7:
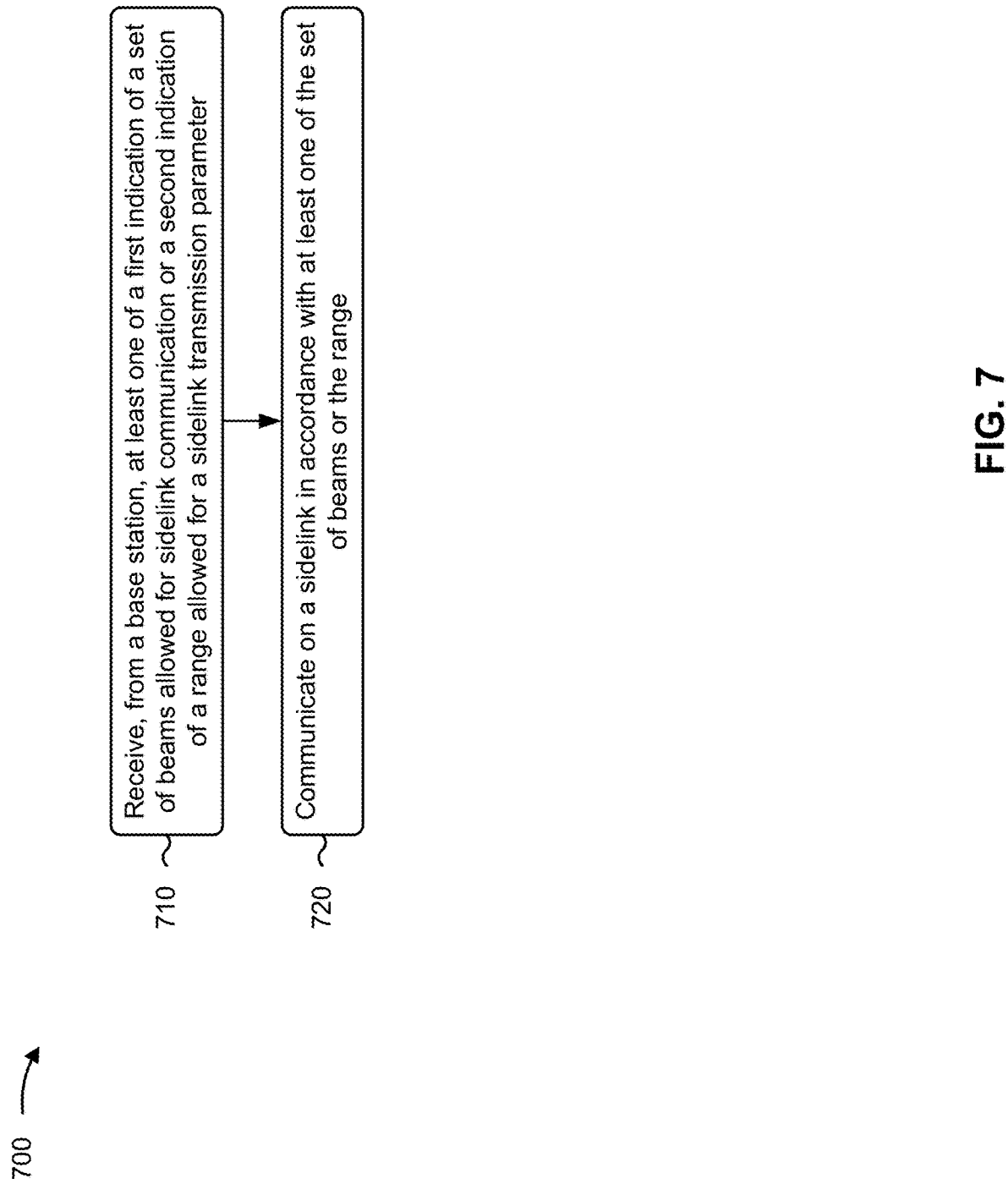
FIGS. 7-8 are diagrams illustrating example processes associated with sidelink beam or transmission parameter range restriction, in accordance with the present disclosure.

FIG. 7 is a diagram illustrating an example process 700 performed, for example, by a UE, in accordance with the present disclosure. Example process 700 is an example where the UE (e.g., UE 120) performs operations associated with sidelink beam or transmission parameter range restriction.

As shown in FIG. 7, in some aspects, process 700 may include receiving, from a base station, at least one of a first indication of a set of beams allowed for sidelink communication or a second indication of a range allowed for a sidelink transmission parameter (block 710). For example, the UE (e.g., using communication manager 140 and/or reception component 902, depicted in FIG. 9) may receive, from a base station, at least one of a first indication of a set of beams allowed for sidelink communication or a second indication of a range allowed for a sidelink transmission parameter, as described above.

As further shown in FIG. 7, in some aspects, process 700 may include communicating on a sidelink in accordance with at least one of the set of beams or the range (block 720). For example, the UE (e.g., using communication manager 140, reception component 902, and/or transmission component 904, depicted in FIG. 9) may communicate on a sidelink in accordance with at least one of the set of beams or the range, as described above.

Process 700 may include additional aspects, such as any single aspect or any combination of aspects described below and/or in connection with one or more other processes described elsewhere herein.

In a first aspect, the first indication includes a list of one or more sidelink beam identifiers.

In a second aspect, alone or in combination with the first aspect, the first indication includes a bitmap indicating one or more sidelink beam identifiers among all sidelink beam identifiers.

In a third aspect, alone or in combination with one or more of the first and second aspects, the first indication indicates that the set of beams are allowed for transmission, that the set of beams are allowed for reception, or that the set of beams are allowed for both transmission and reception.

In a fourth aspect, alone or in combination with one or more of the first through third aspects, the first indication indicates a beam of the set of beams by an identifier for a TCI state used by the UE.

In a fifth aspect, alone or in combination with one or more of the first through fourth aspects, the first indication indicates a beam of the set of beams by an identifier for a reference signal transmitted by the UE.

In a sixth aspect, alone or in combination with one or more of the first through fifth aspects, the first indication indicates a beam of the set of beams by an identifier for a reference signal transmitted by a node other than the UE.

In a seventh aspect, alone or in combination with one or more of the first through sixth aspects, at least one of the set of beams or the range is allowed for at least one or more particular sidelink links, one or more particular bandwidth parts, resource pools, or component carriers, one or more particular resource allocation modes, one or more particular traffic priority levels, one or more of initial transmissions or retransmissions, one or more particular cast types, or some combination thereof.

In an eighth aspect, alone or in combination with one or more of the first through seventh aspects, the first indication is received in an RRC message, a MAC-CE, or DCI.

In a ninth aspect, alone or in combination with one or more of the first through eighth aspects, the set of beams is indicated in the RRC message in an information element for a bandwidth part, an information element for a resource pool, or an information element for a component carrier.

In a tenth aspect, alone or in combination with one or more of the first through ninth aspects, the set of beams is indicated in the DCI, and the DCI schedules one or more sidelink communications for the UE.

In an eleventh aspect, alone or in combination with one or more of the first through tenth aspects, the second indication indicates the range allowed for the sidelink transmission parameter for a particular beam.

In a twelfth aspect, alone or in combination with one or more of the first through eleventh aspects, the sidelink transmission parameter includes at least a transmission power parameter, a modulation and coding scheme parameter, a frequency resource parameter, a time resource parameter, a power control parameter, or some combination thereof.

Figure 9:
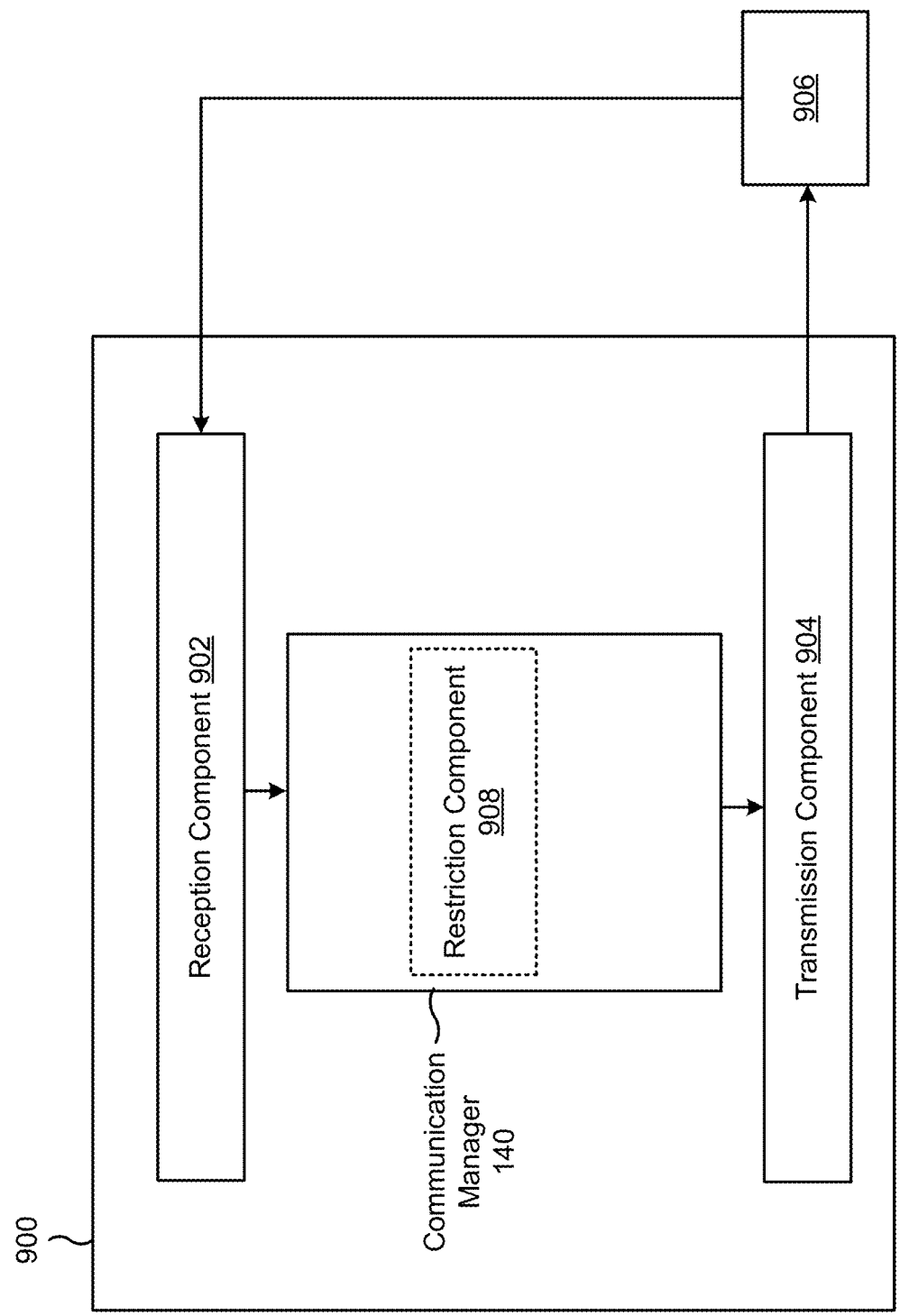
FIGS. 9-10 are diagrams of example apparatuses for wireless communication, in accordance with the present disclosure.

In a thirteenth aspect, alone or in combination with one or more of the first through twelfth aspects, process 700 includes determining (e.g., using communication manager 140 and/or restriction component 908, depicted in FIG. 9) that at least one of a restriction to the set of beams or a restriction to the range is to be discarded or modified based at least in part on a determination that, with restriction to the set of beams or the range, there is no beam that satisfies a metric threshold.

In a fourteenth aspect, alone or in combination with one or more of the first through thirteenth aspects, process 700 includes determining (e.g., using communication manager 140 and/or restriction component 908, depicted in FIG. 9) that at least one of a restriction to the set of beams or a restriction to the range is to be discarded or modified based at least in part on a determination that a difference between a metric that is achievable among selected beams, with restriction to the set of beams or the range, and a metric that is achievable among the selected beams, without restriction to the set of beams or the range, satisfies a threshold.

In a fifteenth aspect, alone or in combination with one or more of the first through fourteenth aspects, process 700 includes discarding or modifying (e.g., using communication manager 140 and/or restriction component 908, depicted in FIG. 9) at least one of a restriction to the set of beams or a restriction to the range.

In a sixteenth aspect, alone or in combination with one or more of the first through fifteenth aspects, process 700 includes transmitting (e.g., using communication manager 140 and/or transmission component 904, depicted in FIG. 9), to the base station, a request to discard or modify at least one of a restriction to the set of beams or a restriction to the range.

In a seventeenth aspect, alone or in combination with one or more of the first through sixteenth aspects, process 700 includes transmitting (e.g., using communication manager 140 and/or transmission component 904, depicted in FIG. 9), to the base station, information identifying a set of selected beams for sidelink communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
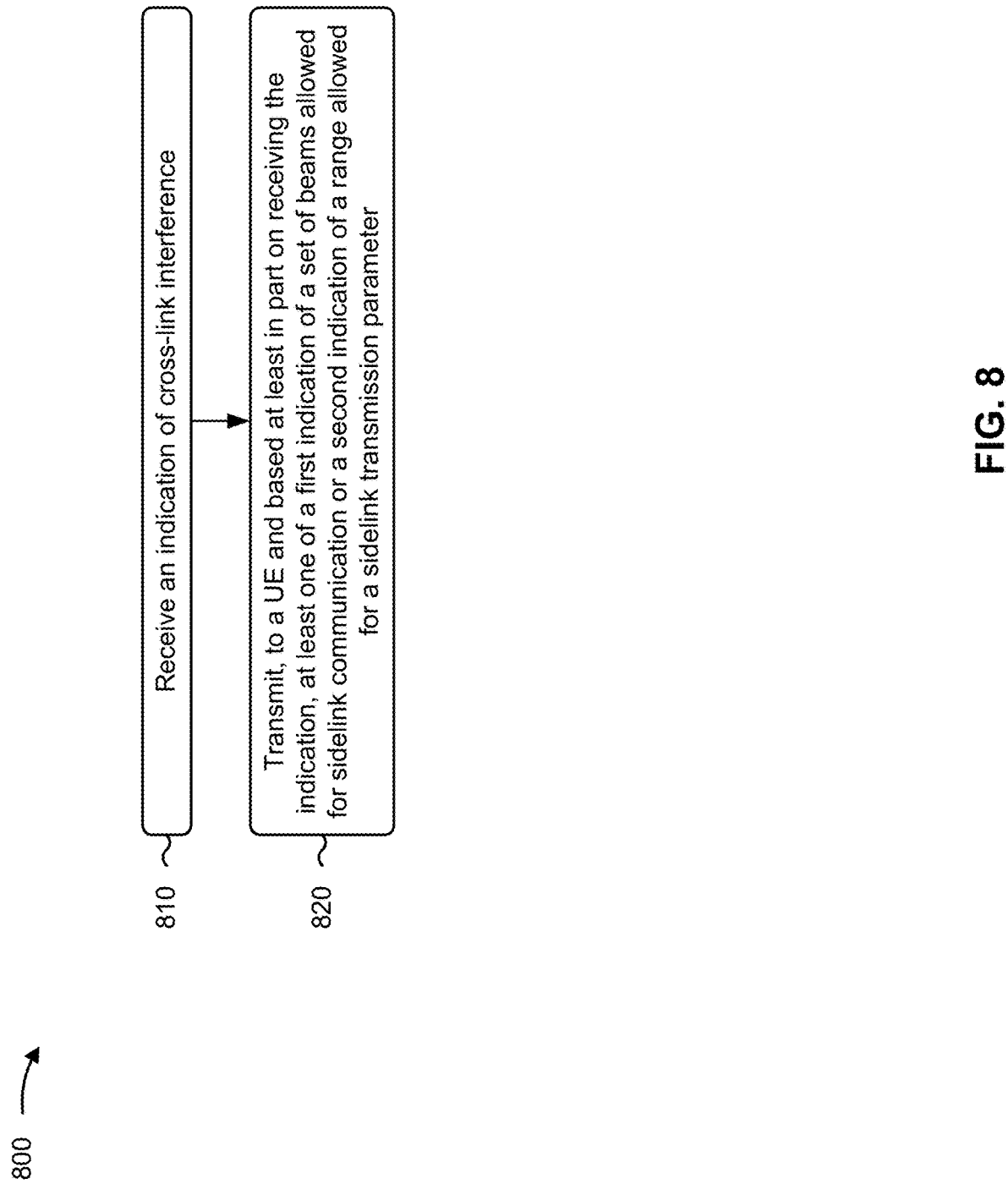

FIG. 8 is a diagram illustrating an example process 800 performed, for example, by a base station, in accordance with the present disclosure. Example process 800 is an example where the base station (e.g., base station 110) performs operations associated with sidelink beam or transmission parameter range restriction.

As shown in FIG. 8, in some aspects, process 800 may include receiving an indication of cross-link interference (block 810). For example, the base station (e.g., using communication manager 150 and/or reception component 1002, depicted in FIG. 10) may receive an indication of cross-link interference, as described above.

As further shown in FIG. 8, in some aspects, process 800 may include transmitting, to a UE and based at least in part on receiving the indication, at least one of a first indication of a set of beams allowed for sidelink communication or a second indication of a range allowed for a sidelink transmission parameter (block 820). For example, the base station (e.g., using communication manager 150 and/or transmission component 1004, depicted in FIG. 10) may transmit, to a UE and based at least in part on receiving the indication, at least one of a first indication of a set of beams allowed for sidelink communication or a second indication of a range allowed for a sidelink transmission parameter, as described above.

Process 800 may include additional aspects, such as any single aspect or any combination of aspects described below and/or in connection with one or more other processes described elsewhere herein.

In a first aspect, the first indication includes a list of one or more sidelink beam identifiers.

In a second aspect, alone or in combination with the first aspect, the first indication includes a bitmap indicating one or more sidelink beam identifiers among all sidelink beam identifiers.

In a third aspect, alone or in combination with one or more of the first and second aspects, the first indication indicates that the set of beams are allowed for transmission, that the set of beams are allowed for reception, or that the set of beams are allowed for both transmission and reception.

In a fourth aspect, alone or in combination with one or more of the first through third aspects, the first indication indicates a beam of the set of beams by an identifier for a TCI state used by the UE.

In a fifth aspect, alone or in combination with one or more of the first through fourth aspects, the first indication indicates a beam of the set of beams by an identifier for a reference signal transmitted by the UE.

In a sixth aspect, alone or in combination with one or more of the first through fifth aspects, the first indication indicates a beam of the set of beams by an identifier for a reference signal transmitted by a node other than the UE.

In a seventh aspect, alone or in combination with one or more of the first through sixth aspects, at least one of the set of beams or the range is allowed for at least one or more particular sidelink links, one or more particular bandwidth parts, resource pools, or component carriers, one or more particular resource allocation modes, one or more particular traffic priority levels, one or more of initial transmissions or retransmissions, one or more particular cast types, or some combination thereof.

In an eighth aspect, alone or in combination with one or more of the first through seventh aspects, the first indication is transmitted in an RRC message, a MAC-CE, or DCI.

In a ninth aspect, alone or in combination with one or more of the first through eighth aspects, the set of beams is indicated in the RRC message in an information element for a bandwidth part, an information element for a resource pool, or an information element for a component carrier.

In a tenth aspect, alone or in combination with one or more of the first through ninth aspects, the set of beams is indicated in the DCI, and the DCI schedules one or more sidelink communications for the UE.

In an eleventh aspect, alone or in combination with one or more of the first through tenth aspects, the second indication indicates the range allowed for the sidelink transmission parameter for a particular beam.

In a twelfth aspect, alone or in combination with one or more of the first through eleventh aspects, the sidelink transmission parameter includes at least a transmission power parameter, a modulation and coding scheme parameter, a frequency resource parameter, a time resource parameter, a power control parameter, or some combination thereof.

Figure 10:
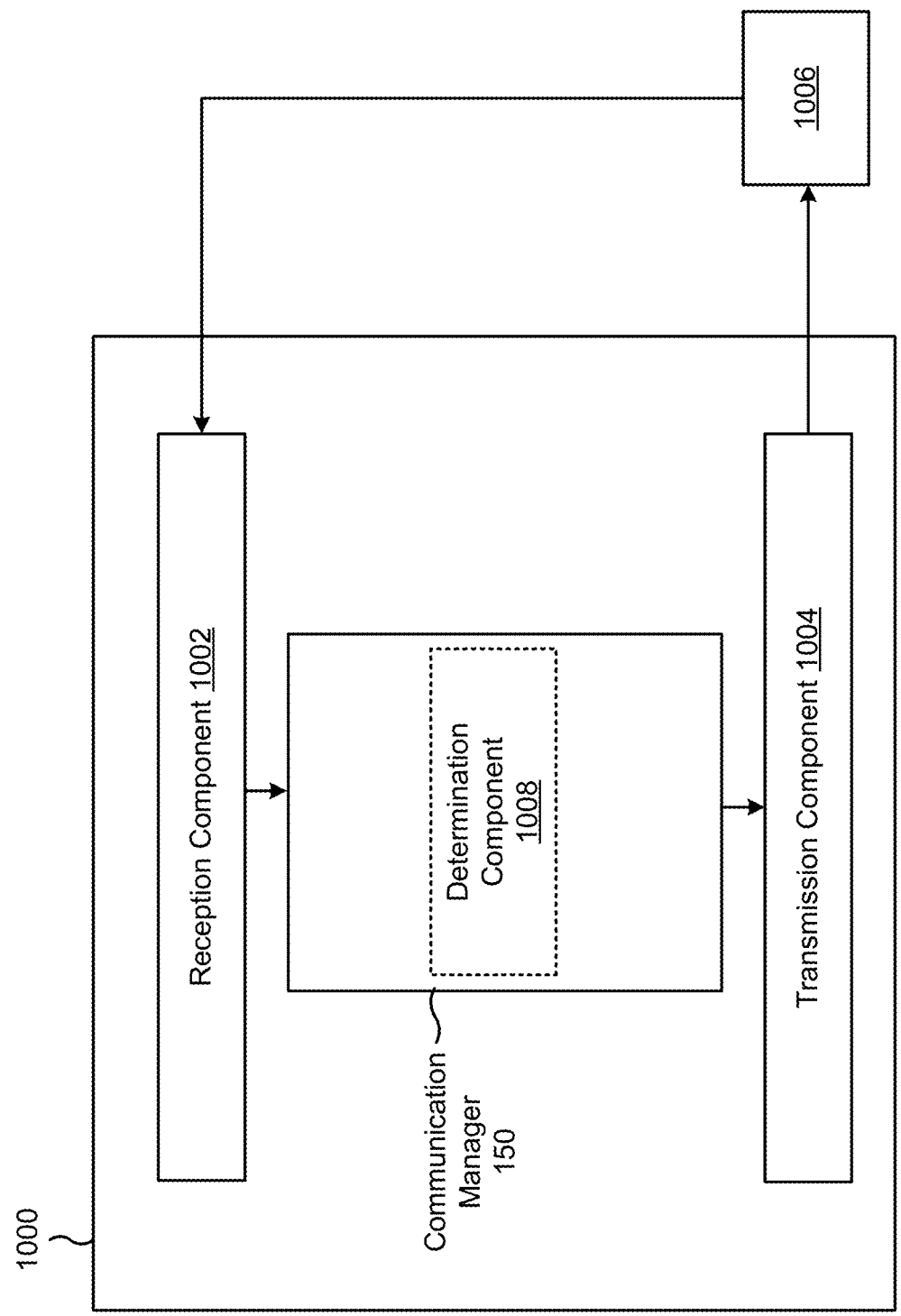

In a thirteenth aspect, alone or in combination with one or more of the first through twelfth aspects, process 800 includes receiving (e.g., using communication manager 150 and/or reception component 1002, depicted in FIG. 10), from the UE, a request to discard or modify at least one of a restriction to the set of beams or a restriction to the range.

In a fourteenth aspect, alone or in combination with one or more of the first through thirteenth aspects, process 800 includes receiving (e.g., using communication manager 150 and/or reception component 1002, depicted in FIG. 10), from the UE, information identifying a set of selected beams for sidelink communication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a restriction component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive at least one of a first indication of a set of beams allowed for sidelink communication or a second indication of a range allowed for a sidelink transmission parameter. The reception component 902 and/or the transmission component 904 may communicate on a sidelink in accordance with at least one of the set of beams or the range.

The restriction component 908 may determine that at least one of a restriction to the set of beams or a restriction to the range is to be discarded or modified based at least in part on a determination that, with restriction to the set of beams or the range, there is no beam that satisfies a metric threshold. The restriction component 908 may determine that at least one of a restriction to the set of beams or a restriction to the range is to be discarded or modified based at least in part on a determination that a difference between a metric that is achievable among selected beams, with restriction to the set of beams or the range, and a metric that is achievable among the selected beams, without restriction to the set of beams or the range, satisfies a threshold. The restriction component 908 may discard or modify at least one of a restriction to the set of beams or a restriction to the range.

The transmission component 904 may transmit a request to discard or modify at least one of a restriction to the set of beams or a restriction to the range. The transmission component 904 may transmit information identifying a set of selected beams for sidelink communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive an indication of cross-link interference. The transmission component 1004 may transmit, based at least in part on receiving the indication, at least one of a first indication of a set of beams allowed for sidelink communication or a second indication of a range allowed for a sidelink transmission parameter. The determination component 1008 may determine at least one of the set of beams allowed for sidelink communication or the range allowed for the sidelink transmission parameter.

The reception component 1002 may receive a request to discard or modify at least one of a restriction to the set of beams or a restriction to the range. The reception component 1002 may receive information identifying a set of selected beams for sidelink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a user equipment (UE), comprising: receiving, from a base station, at least one of a first indication of a set of beams allowed for sidelink communication or a second indication of a range allowed for a sidelink transmission parameter; and communicating on a sidelink in accordance with at least one of the set of beams or the range.

Aspect 2: The method of Aspect 1, wherein the first indication includes a list of one or more sidelink beam identifiers.

Aspect 3: The method of Aspect 1, wherein the first indication includes a bitmap indicating one or more sidelink beam identifiers among all sidelink beam identifiers.

Aspect 4: The method of any of Aspects 1-3, wherein the first indication indicates that the set of beams are allowed for transmission, that the set of beams are allowed for reception, or that the set of beams are allowed for both transmission and reception.

Aspect 5: The method of any of Aspects 1-4, wherein the first indication indicates a beam of the set of beams by an identifier for a transmission configuration indicator (TCI) state used by the UE.

Aspect 6: The method of any of Aspects 1-4, wherein the first indication indicates a beam of the set of beams by an identifier for a reference signal transmitted by the UE.

Aspect 7: The method of any of Aspects 1-4, wherein the first indication indicates a beam of the set of beams by an identifier for a reference signal transmitted by a node other than the UE.

Aspect 8: The method of any of Aspects 1-7, wherein at least one of the set of beams or the range is allowed for at least: one or more particular sidelink links, one or more particular bandwidth parts, resource pools, or component carriers, one or more particular resource allocation modes, one or more particular traffic priority levels, one or more of initial transmissions or retransmissions, one or more particular cast types, or some combination thereof.

Aspect 9: The method of any of Aspects 1-8, wherein the first indication is received in a radio resource control (RRC) message, a medium access control control element (MAC-CE), or downlink control information (DCI).

Aspect 10: The method of Aspect 9, wherein the set of beams is indicated in the RRC message in an information element for a bandwidth part, an information element for a resource pool, or an information element for a component carrier.

Aspect 11: The method of Aspect 9, wherein the set of beams is indicated in the DCI, and wherein the DCI schedules one or more sidelink communications for the UE.

Aspect 12: The method of any of Aspects 1-11, wherein the second indication indicates the range allowed for the sidelink transmission parameter for a particular beam.

Aspect 13: The method of any of Aspects 1-12, wherein the sidelink transmission parameter includes at least: a transmission power parameter, a modulation and coding scheme parameter, a frequency resource parameter, a time resource parameter, a power control parameter, or some combination thereof.

Aspect 14: The method of any of Aspects 1-13, further comprising: determining that at least one of a restriction to the set of beams or a restriction to the range is to be discarded or modified based at least in part on a determination that, with restriction to the set of beams or the range, there is no beam that satisfies a metric threshold.

Aspect 15: The method of any of Aspects 1-14, further comprising: determining that at least one of a restriction to the set of beams or a restriction to the range is to be discarded or modified based at least in part on a determination that a difference between a metric that is achievable among selected beams, with restriction to the set of beams or the range, and a metric that is achievable among the selected beams, without restriction to the set of beams or the range, satisfies a threshold.

Aspect 16: The method of any of Aspects 1-15, further comprising: discarding or modifying at least one of a restriction to the set of beams or a restriction to the range.

Aspect 17: The method of any of Aspects 1-15, further comprising: transmitting, to the base station, a request to discard or modify at least one of a restriction to the set of beams or a restriction to the range.

Aspect 18: The method of any of Aspects 1-17, further comprising: transmitting, to the base station, information identifying a set of selected beams for sidelink communication.

Aspect 19: A method of wireless communication performed by an apparatus of a base station, comprising: receiving an indication of cross-link interference; and transmitting, to a user equipment (UE) and based at least in part on receiving the indication, at least one of a first indication of a set of beams allowed for sidelink communication or a second indication of a range allowed for a sidelink transmission parameter.

Aspect 20: The method of Aspect 19, wherein the first indication includes a list of one or more sidelink beam identifiers.

Aspect 21: The method of Aspect 19, wherein the first indication includes a bitmap indicating one or more sidelink beam identifiers among all sidelink beam identifiers.

Aspect 22: The method of any of Aspects 19-21, wherein the first indication indicates that the set of beams are allowed for transmission, that the set of beams are allowed for reception, or that the set of beams are allowed for both transmission and reception.

Aspect 23: The method of any of Aspects 19-22, wherein the first indication indicates a beam of the set of beams by an identifier for a transmission configuration indicator (TCI) state used by the UE.

Aspect 24: The method of any of Aspects 19-22, wherein the first indication indicates a beam of the set of beams by an identifier for a reference signal transmitted by the UE.

Aspect 25: The method of any of Aspects 19-22, wherein the first indication indicates a beam of the set of beams by an identifier for a reference signal transmitted by a node other than the UE.

Aspect 26: The method of any of Aspects 19-25, wherein at least one of the set of beams or the range is allowed for at least: one or more particular sidelink links, one or more particular bandwidth parts, resource pools, or component carriers, one or more particular resource allocation modes, one or more particular traffic priority levels, one or more of initial transmissions or retransmissions, one or more particular cast types, or some combination thereof.

Aspect 27: The method of any of Aspects 19-26, wherein the first indication is transmitted in a radio resource control (RRC) message, a medium access control control element (MAC-CE), or downlink control information (DCI).

Aspect 28: The method of Aspect 27, wherein the set of beams is indicated in the RRC message in an information element for a bandwidth part, an information element for a resource pool, or an information element for a component carrier.

Aspect 29: The method of Aspect 27, wherein the set of beams is indicated in the DCI, and wherein the DCI schedules one or more sidelink communications for the UE.

Aspect 30: The method of any of Aspects 19-29, wherein the second indication indicates the range allowed for the sidelink transmission parameter for a particular beam.

Aspect 31: The method of any of Aspects 19-30, wherein the sidelink transmission parameter includes at least: a transmission power parameter, a modulation and coding scheme parameter, a frequency resource parameter, a time resource parameter, a power control parameter, or some combination thereof.

Aspect 32: The method of any of Aspects 19-31, further comprising: receiving, from the UE, a request to discard or modify at least one of a restriction to the set of beams or a restriction to the range.

Aspect 33: The method of any of Aspects 19-32, further comprising: receiving, from the UE, information identifying a set of selected beams for sidelink communication.

Aspect 34: An apparatus for wireless communication at a device, comprising a processor; memory coupled with the processor; and instructions stored in the memory and executable by the processor to cause the apparatus to perform the method of one or more of Aspects 1-18.

Aspect 35: A device for wireless communication, comprising a memory and one or more processors coupled to the memory, the one or more processors configured to perform the method of one or more of Aspects 1-18.

Aspect 36: An apparatus for wireless communication, comprising at least one means for performing the method of one or more of Aspects 1-18.

Aspect 37: A non-transitory computer-readable medium storing code for wireless communication, the code comprising instructions executable by a processor to perform the method of one or more of Aspects 1-18.

Aspect 38: A non-transitory computer-readable medium storing a set of instructions for wireless communication, the set of instructions comprising one or more instructions that, when executed by one or more processors of a device, cause the device to perform the method of one or more of Aspects 1-18.

Aspect 39: An apparatus for wireless communication at a device, comprising a processor; memory coupled with the processor; and instructions stored in the memory and executable by the processor to cause the apparatus to perform the method of one or more of Aspects 19-33.

Aspect 40: A device for wireless communication, comprising a memory and one or more processors coupled to the memory, the one or more processors configured to perform the method of one or more of Aspects 19-33.

Aspect 41: An apparatus for wireless communication, comprising at least one means for performing the method of one or more of Aspects 19-33.

Aspect 42: A non-transitory computer-readable medium storing code for wireless communication, the code comprising instructions executable by a processor to perform the method of one or more of Aspects 19-33.

Aspect 43: A non-transitory computer-readable medium storing a set of instructions for wireless communication, the set of instructions comprising one or more instructions that, when executed by one or more processors of a device, cause the device to perform the method of one or more of Aspects 19-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        receive, from a base station, at least one of a first indication of a set of beams allowed for sidelink communication or a second indication of a range allowed for a sidelink transmission parameter;
        perform at least one of:
            discard or modify at least one of a restriction to the set of beams or a restriction to the range, or
            transmit, to the base station, a request to discard or modify at least one of the restriction to the set of beams or the restriction to the range; and
        communicate on a sidelink in accordance with at least one of the set of beams or the range.

2. The apparatus of claim 1, wherein the first indication includes a list of one or more sidelink beam identifiers or a bitmap indicating one or more sidelink beam identifiers among all sidelink beam identifiers.

3. The apparatus of claim 1, wherein the first indication indicates that the set of beams are allowed for transmission, that the set of beams are allowed for reception, or that the set of beams are allowed for both transmission and reception.

4. The apparatus of claim 1, wherein at least one of the set of beams or the range is allowed for at least:
    one or more particular sidelink links,
    one or more particular bandwidth parts, resource pools, or component carriers,
    one or more particular resource allocation modes,
    one or more particular traffic priority levels,
    one or more of initial transmissions or retransmissions,
    one or more particular cast types, or
    some combination thereof.

5. The apparatus of claim 1, wherein the set of beams is indicated in a radio resource control message in an information element for a bandwidth part, an information element for a resource pool, or an information element for a component carrier.

6. The apparatus of claim 1, wherein the set of beams is indicated in downlink control information (DCI), and
    wherein the DCI schedules one or more sidelink communications for the UE.

7. The apparatus of claim 1, wherein the second indication indicates the range allowed for the sidelink transmission parameter for a particular beam.

8. The apparatus of claim 1, wherein the sidelink transmission parameter includes at least:
    a transmission power parameter,
    a modulation and coding scheme parameter,
    a frequency resource parameter,
    a time resource parameter,
    a power control parameter, or
    some combination thereof.

9. The apparatus of claim 1, wherein the one or more processors are further configured to:
    determine that at least one of the restriction to the set of beams or the restriction to the range is to be discarded or modified based at least in part on a determination that, with restriction to the set of beams or the range, there is no beam that satisfies a metric threshold.

10. The apparatus of claim 1, wherein the one or more processors are further configured to:
    determine that at least one of the restriction to the set of beams or the restriction to the range is to be discarded or modified based at least in part on a determination that a difference between a metric that is achievable among selected beams, with restriction to the set of beams or the range, and a metric that is achievable among the selected beams, without restriction to the set of beams or the range, satisfies a threshold.

11. The apparatus of claim 1, wherein the one or more processors are further configured to:
transmit, to the base station, information identifying a set of selected beams for sidelink communication.

12. An apparatus for wireless communication at a base station, comprising:
a memory; and
one or more processors, coupled to the memory, configured to:
receive an indication of cross-link interference;
transmit, to a user equipment (UE) and based at least in part on receiving the indication, at least one of a first indication of a set of beams allowed for sidelink communication or a second indication of a range allowed for a sidelink transmission parameter; and
receive, from the UE, a request to discard or modify at least one of a restriction to the set of beams or a restriction to the range.

13. The apparatus of claim 12, wherein the first indication includes a list of one or more sidelink beam identifiers or a bitmap indicating one or more sidelink beam identifiers among all sidelink beam identifiers.

14. The apparatus of claim 12, wherein the first indication indicates that the set of beams are allowed for transmission, that the set of beams are allowed for reception, or that the set of beams are allowed for both transmission and reception.

15. The apparatus of claim 12, wherein at least one of the set of beams or the range is allowed for at least:
one or more particular sidelink links,
one or more particular bandwidth parts, resource pools, or component carriers,
one or more particular resource allocation modes,
one or more particular traffic priority levels,
one or more of initial transmissions or retransmissions,
one or more particular cast types, or
some combination thereof.

16. The apparatus of claim 12, wherein the set of beams is indicated in a radio resource control message in an information element for a bandwidth part, an information element for a resource pool, or an information element for a component carrier.

17. The apparatus of claim 12, wherein the set of beams is indicated in downlink control information (DCI), and
wherein the DCI schedules one or more sidelink communications for the UE.

18. The apparatus of claim 12, wherein the second indication indicates the range allowed for the sidelink transmission parameter for a particular beam.

19. The apparatus of claim 12, wherein the sidelink transmission parameter includes at least:
a transmission power parameter,
a modulation and coding scheme parameter,
a frequency resource parameter,
a time resource parameter,
a power control parameter, or
some combination thereof.

20. The apparatus of claim 12, wherein the one or more processors are further configured to:
receive, from the UE, information identifying a set of selected beams for sidelink communication.

21. A method of wireless communication performed by an apparatus of a user equipment (UE), comprising:

receiving, from a base station, at least one of a first indication of a set of beams allowed for sidelink communication or a second indication of a range allowed for a sidelink transmission parameter;
performing at least one of:
discarding or modifying at least one of a restriction to the set of beams or a restriction to the range, or
transmitting a request to discard or modify at least one of the restriction to the set of beams or the restriction to the range; and
communicating on a sidelink in accordance with at least one of the set of beams or the range.

22. The method of claim 21, wherein at least one of the set of beams or the range is allowed for at least:
one or more particular sidelink links,
one or more particular bandwidth parts, resource pools, or component carriers,
one or more particular resource allocation modes,
one or more particular traffic priority levels,
one or more of initial transmissions or retransmissions,
one or more particular cast types, or
some combination thereof.

23. The method of claim 21, further comprising:
determining that at least one of the restriction to the set of beams or the restriction to the range is to be discarded or modified based at least in part on a determination that, with restriction to the set of beams or the range, there is no beam that satisfies a metric threshold.

24. The method of claim 21, further comprising:
determining that at least one of the restriction to the set of beams or the restriction to the range is to be discarded or modified based at least in part on a determination that a difference between a metric that is achievable among selected beams, with restriction to the set of beams or the range, and a metric that is achievable among the selected beams, without restriction to the set of beams or the range, satisfies a threshold.

25. The method of claim 21, wherein the first indication includes a list of one or more sidelink beam identifiers or a bitmap indicating one or more sidelink beam identifiers among all sidelink beam identifiers.

26. A method of wireless communication performed by an apparatus of a base station, comprising:
receiving an indication of cross-link interference;
transmitting, to a user equipment (UE) and based at least in part on receiving the indication, at least one of a first indication of a set of beams allowed for sidelink communication or a second indication of a range allowed for a sidelink transmission parameter; and
receiving, from the UE, a request to discard or modify at least one of a restriction to the set of beams or a restriction to the range.

27. The method of claim 26, wherein at least one of the set of beams or the range is allowed for at least:
one or more particular sidelink links,
one or more particular bandwidth parts, resource pools, or component carriers,
one or more particular resource allocation modes,
one or more particular traffic priority levels,
one or more of initial transmissions or retransmissions,
one or more particular cast types, or
some combination thereof.

28. The method of claim 26, wherein the first indication includes a list of one or more sidelink beam identifiers or a bitmap indicating one or more sidelink beam identifiers among all sidelink beam identifiers.

29. The method of claim 26, wherein the first indication indicates that the set of beams are allowed for transmission, that the set of beams are allowed for reception, or that the set of beams are allowed for both transmission and reception.

30. The method of claim 26, wherein the sidelink transmission parameter includes at least:
a transmission power parameter,
a modulation and coding scheme parameter,
a frequency resource parameter,
a time resource parameter,
a power control parameter, or
some combination thereof.

\* \* \* \* \*